US007698391B2

(12) United States Patent
Paliwal et al.

(10) Patent No.: US 7,698,391 B2
(45) Date of Patent: Apr. 13, 2010

(54) PERFORMING A PROVISIONING OPERATION ASSOCIATED WITH A SOFTWARE APPLICATION ON A SUBSET OF THE NODES ON WHICH THE SOFTWARE APPLICATION IS TO OPERATE

(75) Inventors: Bharat Paliwal, Fremont, CA (US); Nitin Jerath, Delhi (IN); Gaurav Manglik, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1010 days.

(21) Appl. No.: 11/131,025

(22) Filed: May 16, 2005

(65) Prior Publication Data

US 2006/0259594 A1 Nov. 16, 2006

(51) Int. Cl.
*G06F 13/00* (2006.01)
(52) U.S. Cl. ...................................... 709/220
(58) Field of Classification Search ............ 705/5, 705/6, 1, 28, 26, 27, 56, 35, 37, 44, 10, 14, 705/30, 7; 709/203–205, 217–219, 204, 709/220–222, 206–207; 710/8–11; 717/121, 717/126, 177, 101; 725/40, 39, 37, 32, 22
See application file for complete search history.

(56) References Cited

U.S. PATENT DOCUMENTS

| | | | | |
|---|---|---|---|---|
| 6,173,420 B1 * | 1/2001 | Sunkara et al. | ............... | 714/38 |
| 6,202,149 B1 * | 3/2001 | Hedegard | ................... | 713/100 |
| 6,289,382 B1 * | 9/2001 | Bowman-Amuah | ......... | 709/226 |
| 6,801,937 B1 * | 10/2004 | Novaes et al. | ................ | 709/220 |
| 7,340,739 B2 * | 3/2008 | Alam | ......................... | 717/175 |
| 2004/0139145 A1 * | 7/2004 | Bar-or et al. | ................. | 709/200 |
| 2005/0234680 A1 * | 10/2005 | Dettinger et al. | ............. | 702/182 |
| 2005/0267951 A1 * | 12/2005 | Joshi et al. | ................... | 709/220 |

OTHER PUBLICATIONS

Choi, Phil, "Oracle Universal Installer Concepts Guide, 10g Release 1 (10.1)," Oracle, Dec. 2003, 66 pages. (reference provided on enclosed CD-ROM).
Choi, Phil, "Oracle Enterprise Manager Grid Control Installation and Basic Configuration, 10g Release 1 (10.1)," Oracle, Jul. 2004, 66 pages. (reference provided on enclosed CD-ROM).
Huey, Patricia, "Oracle Database Installation Guide, 10g Release 1 (10.1.0.2.0) for Windows," Oracle, Sep. 2004, 164 pages. (reference provided on enclosed CD-ROM).

(Continued)

*Primary Examiner*—Robert B Harrell
(74) *Attorney, Agent, or Firm*—Hickman Palermo Truong & Becker LLP; Eric L. Sutton

(57) ABSTRACT

An application deployment architecture provides the capability to independently invoke different phases of an operation associated with an application, thereby progressively deploying the application across a network of peer nodes and providing fault tolerance. Therefore, applications are easier to deploy on the network of nodes, the deployment process is less error prone, and remediation of deployment errors is simpler than with prior approaches. Tasks constituent to phases of a deployment process are schedulable rather than completely automated and outside the control of the administrator, and are schedulable on a subset of the nodes rather than only on the entire network of nodes.

20 Claims, 5 Drawing Sheets

OTHER PUBLICATIONS

Austin, David et al., "Oracle Real Application Clusters Installation and Configuration Guide, 10g Release 1 (10.1) for AIX-Based Systems, Apple Mac OS X, hp HP-UX, hp Tru64 UNIX, Linux, Solaris Operating System and Windows Platforms," Oracle, Dec. 2004, 468 pages. (reference provided on enclosed CD-ROM).

Oracle Corporation, "Oracle Database Quick Installation Guide, 10 g Release 1 (10.1.0.2.0) for Windows," Oracle, Mar. 2004, 28 pages. (reference provided on enclosed CD-ROM).

* cited by examiner

PERFORMING A PROVISIONING OPERATION ASSOCIATED WITH A SOFTWARE APPLICATION ON A SUBSET OF THE NODES ON WHICH THE SOFTWARE APPLICATION IS TO OPERATE

FIELD OF THE INVENTION

The present invention relates generally to deployment and life-cycle management of software applications and, more specifically, to progressive deployment of applications on a set of nodes that function as peers in a computing system in which processing is transparently distributed across the set of nodes.

BACKGROUND

Networked computing resources are frequently configured so that processing is distributed across the resources, such as with a large set of nodes configured in a cluster environment or grid environment. As a result, related application deployment and life-cycle management activities have become more complex, cumbersome and error-prone. For example, configuring a large network of nodes to execute instances of a database server that all share a common database is typically a manual process.

With one prior approach, this manual deployment process generally involved several steps, as follows. First, an operation for an application (e.g., installing, upgrading, patching, uninstalling) is performed on a first node of the network, from the first node. Then, it is verified whether or not the operation was performed successfully on the first node. The foregoing steps are then performed for each other node of the network, in sequence, from the respective node. Finally, the nodes in the network are configured so that each node is aware of each other node (in the case of an initial network provisioning process), e.g., each node is informed that it is part of a cluster, each node is informed of each other peer node, each node is informed that it should treat each other node in the network equally, and the like.

Advances have been made relative to the manual approach, by enhancing the deployment process to include some automation of the process. One prior approach involves the following deployment process. First, the network of nodes is configured so that each node is aware of each other node. Then, one of several phases of the operation is performed on any node in the network, from that node, e.g., files are copied to the node. Next, automatic propagation of that phase of the operation to each of the other network nodes is triggered from the first node. This automatic propagation includes, for example, determining a list of files that need to be copied to each of the other nodes in the network, and automatically copying those files to the other nodes. The steps of performing a next phase of the operation and automatically propagating that phase to the other network nodes, for each of the other phases of the operation, are repeated. For example, subsequent phases of the operation may involve moving the copied files to appropriate directories, updating registries, maintaining an inventory of applications for each respective node, and the like.

The foregoing automated approach to the deployment process eliminated previously required manual steps, however, this automated approach has room for improvement. For example, in the event that a failure occurred anywhere in the process (i.e., at the first node or at any of the other nodes on which any phase of the operation is performed), then the completed portion of the process needs to be undone and the entire process started over again once the reason for the error is diagnosed and remedied. Hence, this prior automated approach to the deployment process is not very resilient or fault tolerant.

Additionally, this prior automated approach is inflexible. For example, once the deployment process is initiated, all of the tasks associated with the process are automatically performed (or at least attempted) without any management or control afforded the administrator except aborting the entire process and starting over. Furthermore, once a network of nodes has been configured as a cluster or grid, the deployment process is automatically performed on every node in the network. For example, when updating an application on the nodes in the network, it was necessary to disable all the nodes, update the application on all the nodes, and then enable all the nodes. This results in the entire system being disabled for a significant period of time while the application is updated on all the nodes and, consequently, the system is unable to service requests during that time period.

Based on the foregoing, there is room for improvement in processes for provisioning, including deploying software on, a managed network of nodes operating as peers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

SUMMARY

Figure 1:
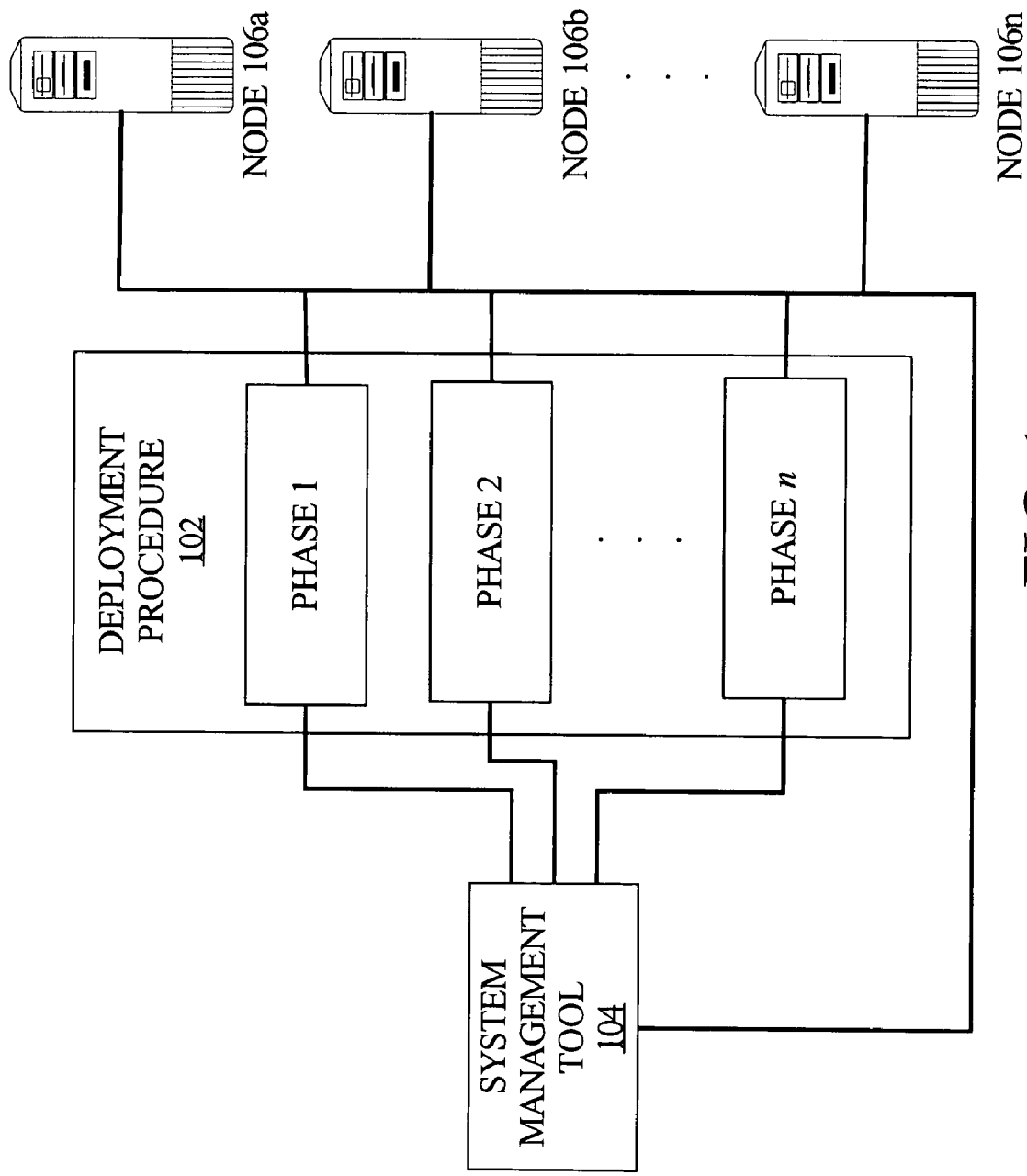
FIG. 1 is a block diagram that illustrates an operating environment in which an embodiment of the invention may be implemented.

Generally, an application deployment architecture provides the capability to independently invoke various different phases of an operation associated with an application, in relation to various nodes in the network, thereby progressively deploying the application across the network of nodes and providing fault tolerance. Therefore, applications are easier to deploy on the network of nodes, the deployment process is less error prone, and remediation of deployment errors is simpler than with prior approaches. Additionally, more control over the deployment process is afforded an administrator than with past approaches. For example, tasks constituent to phases of a deployment process are schedulable rather than completely automated and outside the control of the administrator, and are schedulable on a subset of the nodes rather than only on the entire network of nodes.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are described for progressive deployment of applications on a networked set of peer nodes. The term "deployment" and related terms (e.g., "deploying") are used generally herein to include operations on an application other than strictly installing the application, and to include application maintenance type operations. For example, the term "deployment" herein refers to any of an application install operation, upgrade operation, patch operation, uninstall operation, and the like. Additionally, a networked set of peer nodes, with which processing of work is transparently (i.e., transparent to the client) distributed across the nodes, is sometimes referred to as a "cluster" or a computing "grid." For example, a network of machines that is configured so that each machine executes an instance of a database server that has access to shared data stored in one or more databases is sometimes referred to as a database cluster.

Further, grid computing can be generally described as computing as a utility, where a client does not care where data resides or what machine processes requests. On the server side, grid computing is concerned with resource allocation, information sharing, and high availability, for example. Resource allocation ensures that all clients (e.g., users and applications) that are requesting resources are getting what is requested, and that resources are not standing idle while requests are going unserviced. Information sharing ensures that the information that clients require is available where and when it is needed. High availability features guarantee that all the data and computation will always be available.

Functional Overview of Embodiments of the Invention

Generally, an application deployment architecture provides the capability to independently invoke various different phases of an operation associated with an application, in relation to various nodes in the network, thereby progressively deploying the application across the network of nodes and providing fault tolerance. Therefore, applications are easier to deploy on the network of nodes, the deployment process is less error prone, and remediation of deployment errors is simpler than with prior approaches. Additionally, more control over the deployment process is afforded an administrator than with past approaches. For example, tasks constituent to phases of a deployment process are schedulable rather than completely automated and outside the control of the administrator, and are schedulable on a subset of the nodes rather than only on the entire network of nodes.

Operating Environment

FIG. 1 is a block diagram that illustrates an operating environment in which an embodiment of the invention may be implemented. FIG. 1 depicts a system management tool 104 used to separately invoke each of multiple phases of a deployment procedure 102, for deploying an application on one or more of a plurality of networked peer nodes 106a, 106b-106n.

Each of nodes 106a-106n is a machine on which on operation associated with application software is performed. For example, each node 106a-106n may be implemented as, or similar to, computer system 500 of FIG. 5. However, not all of the components of computer system 500 are required for nodes 106a-106n. Examples of operations that may be performed in association with an application include an installation operation, an upgrade operation, a patch operation, an uninstall operation, and the like. The number of nodes in a system as illustrated in FIG. 1 may vary from implementation to implementation and, therefore, depiction of nodes 106a-106n is for purposes of example only.

Nodes 106a-106n are communicatively coupled to each other, such as via a network. Each of nodes 106a-106n executes an instance of a particular software application, and operates as a peer in the system illustrated in FIG. 1. Therefore, nodes 106a-106n are configured as peers according to conventional means, so that each node is "aware" of the other nodes and so that each node communicates and operates as a peer with each of the other nodes. Furthermore, in the context of the techniques described herein, each instance of the particular application operates as a peer with each of the other instances of the same particular application on the other peer nodes. For a non-limiting example, each of nodes 106-106n may execute an instance of a database server that manages shared data stored in one or more databases. Such an operating environment is sometimes referred to as a database "cluster", and the cluster concept has evolved (generally based on the nodes' capabilities to share information and transparently perform distributed work in parallel, with high availability failover capabilities) into a concept sometimes referred to as a computing grid or simply a "grid."

According to embodiments described herein, a deployment procedure 102 comprises multiple phases, illustrated as "Phase 1", "Phase 2" and "Phase n" in FIG. 1. The number of phases of a deployment procedure may vary from application to application and from implementation to implementation. Therefore, the depiction in FIG. 1 of Phase 1-Phase n is for purposes of example only. Each of the multiple phases of deployment procedure 102 can be invoked separately and independently. Furthermore, each of the multiple phases of deployment procedure 102 can be invoked to execute in association with each of nodes 106a-106n, separately and independently. Significant advantages to a phased, or modular, deployment procedure 102 are described hereafter.

In one embodiment, (1) a first phase of a deployment procedure involves copying application information (e.g., the application installation files, such as libraries, supporting documentation, etc.) to a node machine, (2) a second phase of the deployment procedure involves performing one or more actions on the application information (e.g., organizing the information into directories, initializing or updating registries, etc.) on the node, and (3) a third phase of the deployment procedure involves indicating in an inventory that the application information is installed on the node (e.g., including the application in a list of applications that are installed on the various nodes in the system, and indicating which applications are installed in a cluster-installed or grid-installed manner).

In one embodiment, the operating environment includes and utilizes a system management tool 104, from which each of nodes 106a-106b can be configured, and from which each of the multiple phases of deployment procedure 102 can be invoked on one or more of the nodes 106a-106n. Thus, tasks associated with deployment procedure 102 can be scheduled and controlled from system management tool 104.

Progressive Deployment of an Application in a Network of Peer Nodes

With prior approaches to automated application deployment on a group of networked nodes, the nodes would initially need to be configured as clustered nodes, and then execution of an automated deployment procedure triggered from one of the nodes in order to install an instance of a particular application on each of the nodes, and to update an inventory of applications that are installed on each node in the cluster. All of the nodes were required to be enabled in order to start the deployment procedure. Once the deployment procedure started, the procedure proceeded on all of the nodes and results were reported. With the modular deployment procedure 102 depicted in FIG. 1, an application can be deployed, e.g., installed, on a network of peer nodes in a phased manner. Hence, every phase of a given deployment procedure need not be performed for every node 106a-106n in the system during a single deployment.

Figure 2:
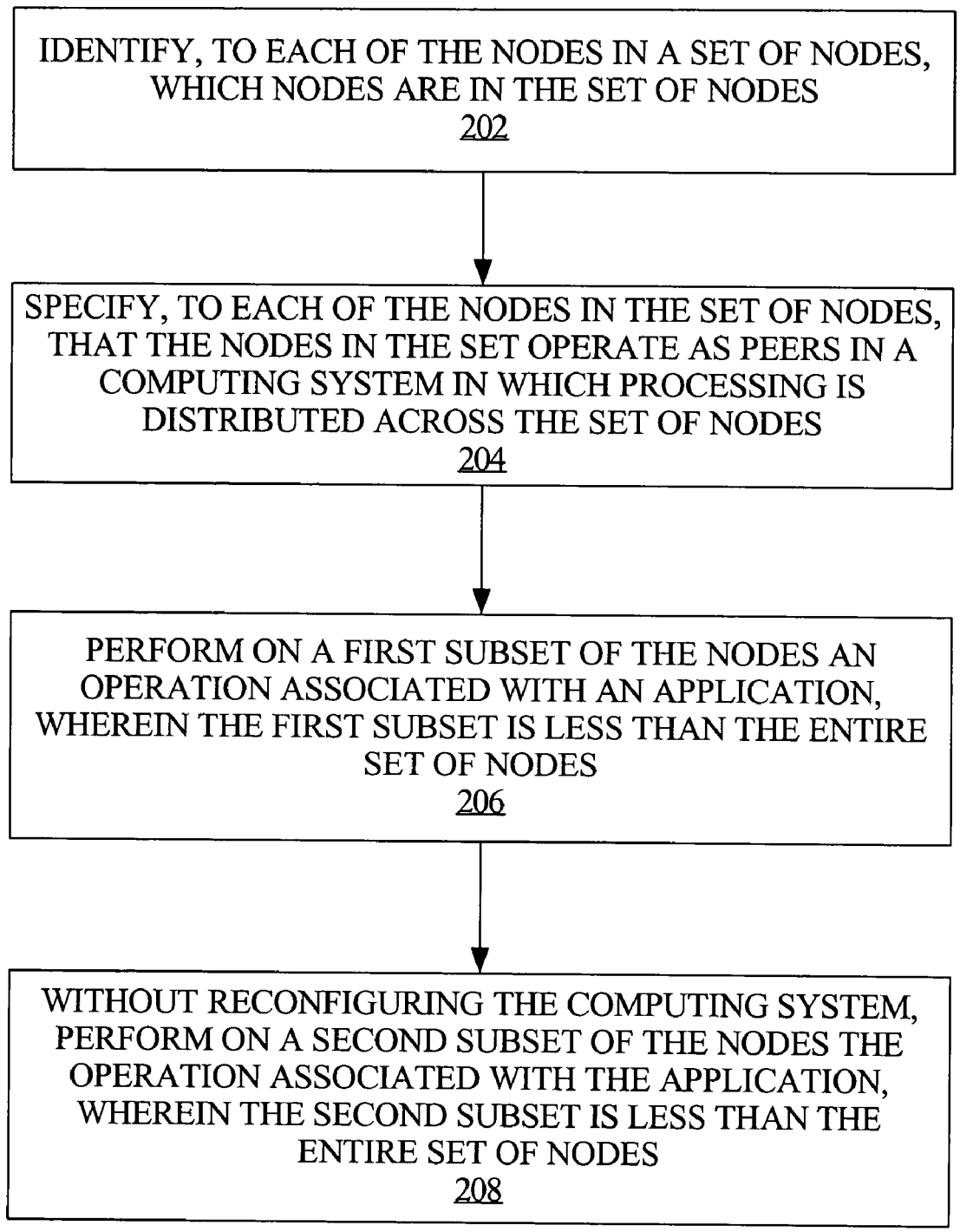
FIG. 2 is a flow diagram that illustrates a process for progressively provisioning a set of nodes in a computing system in which processing is distributed across the set of nodes, according to an embodiment of the invention.

FIG. 2 is a flow diagram that illustrates a process for progressively provisioning a set of nodes in a computing system in which processing is distributed across the set of nodes, according to an embodiment of the invention. In one embodiment, the process of FIG. 2 is performed by executing one or more sequences of instructions that cause one or more processors to perform the described actions, such as processors 504 of computer system 500 of FIG. 5. For example, system management tool 104 separately invokes deployment procedure 102 on multiple nodes 106a-106n from a single node.

At block 202, the computing system is configured by identifying, to each of the nodes in the set of nodes, which nodes are in the set of nodes. At block 204, the computing system is further configured by specifying, to each of the nodes in the set of nodes, that the nodes are to operate as peers. For example, in the context of a database cluster, each of the nodes in the cluster are configured, from system management tool 104 (FIG. 1), as a node in the cluster and configured with a list of the other nodes in the cluster.

At block 206, an operation associated with an application is performed on a first subset of the nodes. The first subset of nodes is less than the entire set of nodes. For example, a database server is installed on a first node, such as node 106a (FIG. 1). Then, at block 208, the operation is performed on a second subset of the nodes. The second subset of nodes is less than the entire set of nodes, and is a different subset of nodes than the first subset of nodes. For example, after confirming that that database server was successfully installed on the first node, then the database server is installed on the other nodes in the set of nodes. Hence, the operation is performed on each node as though the node was a stand-alone machine rather than part of a computing system in which processing is distributed across nodes, e.g., a cluster or grid. Furthermore, when performing the operation on one of the subsets of nodes, the other subset(s) of nodes may be disabled.

Fault Tolerant Mass Deployment of an Application in a Network of Peer Nodes

With prior approaches to automated application deployment on a group of networked nodes, once the deployment procedure is started, the procedure automatically continues on each of the nodes in the computing system. If a failure occurs at any of the nodes, then the successively completed portions of the procedure need to be undone and the entire procedure restarted upon determining the cause of the failure and performing any necessary remedial operations to overcome the failure. Such an approach, therefore, is not considered fault-tolerant.

In one embodiment, the operation that is performed in association with the application, such as deployment procedure 102 (FIG. 1), is performed in phases. That is, each phase of the deployment procedure 102 is separately and independently invocable (e.g., from system management tool 104 (FIG. 1)). Hence, each phase can be performed on a given node before proceeding to perform any phase on any of the other nodes. Consequently, if a failure occurs during any phase of the operation on any node, the results of any previously successful phases are not required to be undone and the entire deployment procedure 102 does not need to be restarted and successful work repeated.

In the context of the embodiment in which the deployment operation comprises the three phases described herein (e.g., copy files, organize files, generate/update inventory), each of the three phases can be performed on a single node, or a node functioning as a test-bed, and successful completion confirmed. Then, each of the three phases can be performed on another node, successful completion confirmed, and so on. Thus, failures at a node are reported and can be remedied immediately, before attempting deployment on subsequent nodes and without reverting any part of the deployment that was already performed successfully on the failed node, or any other node.

Figure 3:
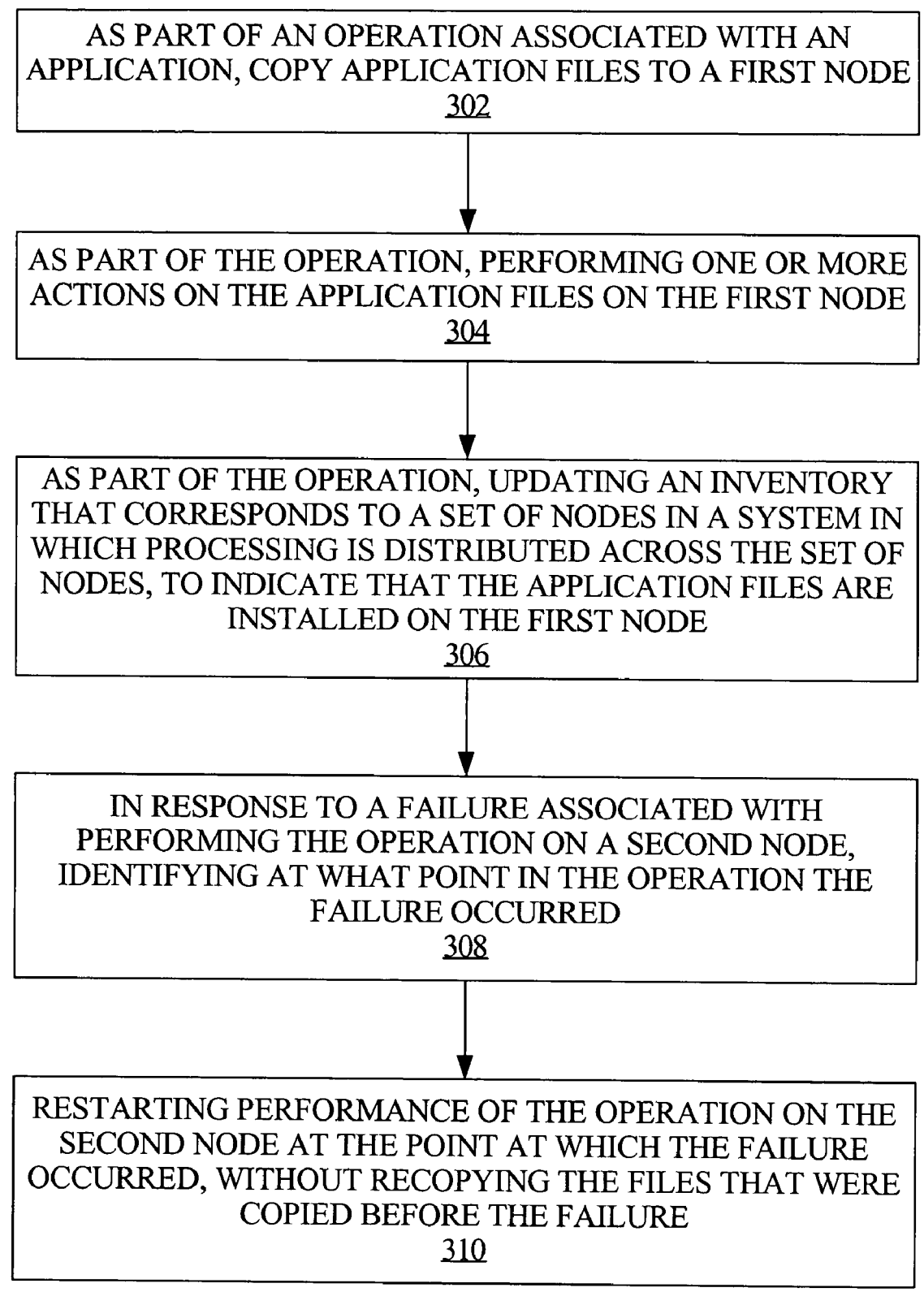
FIG. 3 is a flow diagram that illustrates a process for progressively provisioning a set of nodes in a computing system in which processing is distributed across the set of nodes, according to an embodiment of the invention.

FIG. 3 is a flow diagram that illustrates a process for progressively provisioning a set of nodes in a computing system in which processing is distributed across the set of nodes, according to an embodiment of the invention. In one embodiment, the process of FIG. 3 is performed by executing one or more sequences of instructions that cause one or more processors to perform the described actions, such as processors 504 of computer system 500 of FIG. 5. For example, system management tool 104 separately and sequentially invokes various phases of deployment procedure 102 on one or more nodes 106a-106n from a single node.

At block 302, as part of performing an operation on a first node of a set of nodes in a computing system in which processing is distributed across the set of nodes, copy one or more application files to the first node. For example, copy application installation files, such as libraries, supporting documentation, etc., to a first node.

At block 304, as part of the operation, perform one or more actions on at least one of the application files. For example, organize the files into directories, initialize or update registries, etc., on the first node.

At block 306, as part of the operation, update an inventory that corresponds to the set of nodes, to indicate that the one or more application files are installed on the first node.

At block 308, in response to a failure associated with performing the operation on a second node from the set of nodes, identify at what point in the operation the failure occurred. For example, perhaps the copy phase of the operation failed because the second node did not have enough available memory, and this failure is reported and the operation aborts. As a result of the phased approach to performing the operation, i.e., each phase is separately and independently invocable, the deployment procedure 102 (FIG. 1) includes a checkpointing process that maintains checkpoints associated with the progress of the operation. Thus, the point at which the failure occurred is readily identifiable and reportable. Hence, an administrator can be notified of the failure, and the point of the failure, via a reporting mechanism.

Assuming the cause of the failure is identified and remedial action taken, at block 310, performance of the operation is restarted on the second node at the point at which the failure occurred. Significantly, as a result of each phase of deployment procedure 102 being separately and independently invocable, the operation can be restarted on the second node without having to clean up (e.g., uninstall) the files that were already copied, and without having to recopy the files that were successfully copied before the failure occurred. In other words, phases of the operation that were successfully completed on any of the nodes do not have to be repeated.

Updating an Application in a Network of Peer Nodes

With prior approaches to automated application deployment on a group of networked nodes, for an application update operation, all of the nodes in the system would need to be disabled (i.e., temporarily removed from operation), and then all of the nodes provisioned together as a single procedure. Hence, the entire system and the services provided by the system are temporarily unavailable for a period of time while the nodes are being provisioned. With the modular deployment procedure 102 depicted in FIG. 1, the entire system does not have to be provisioned all at once. Hence, one or more nodes of the system can remain on-line while provisioning a large portion of the system, with those nodes eventually disabled for a shorter period only while those nodes are being provisioned. Consequently, there is a significantly smaller time period in which the entire system services and resources are unavailable.

Figure 4:
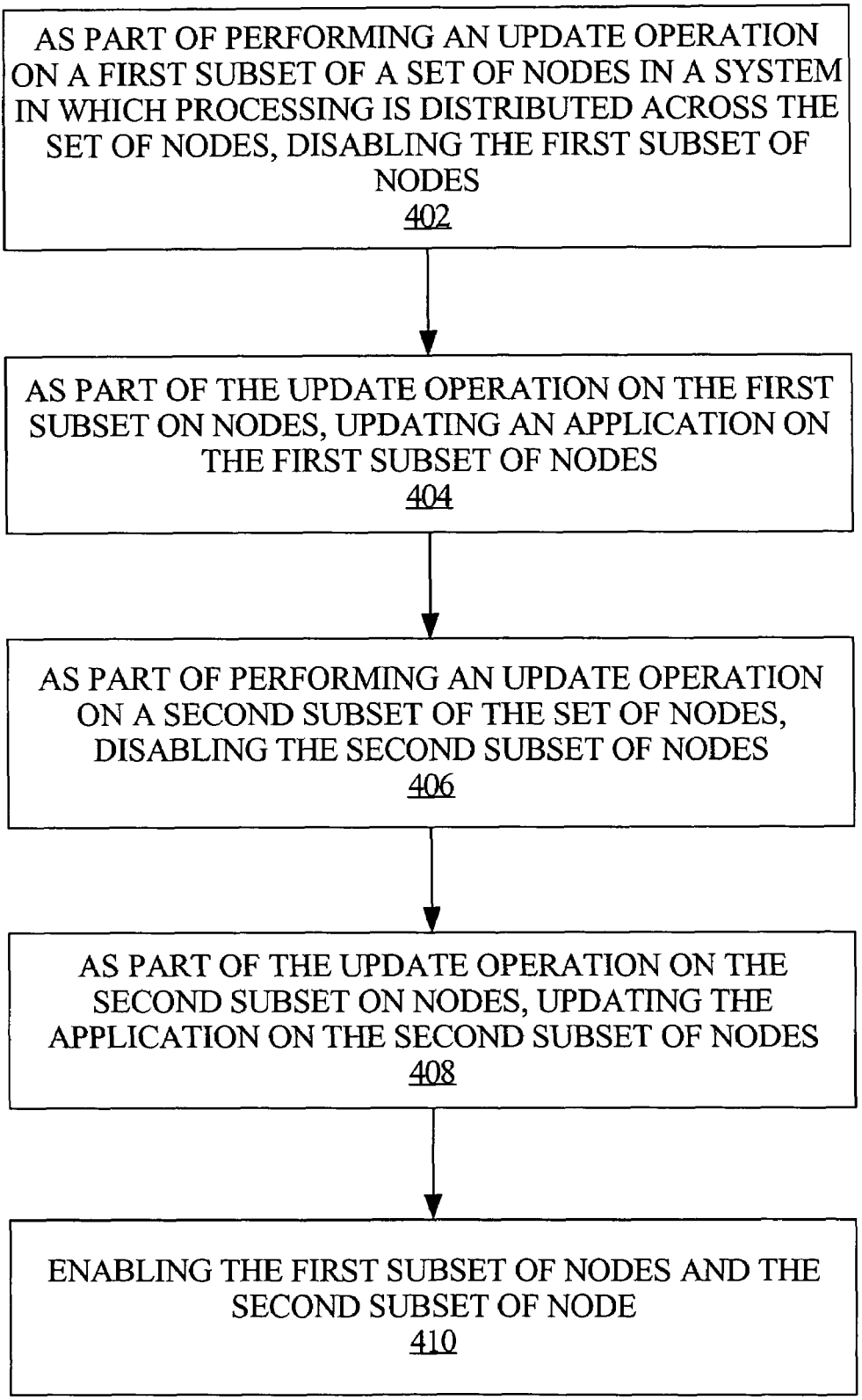
FIG. 4 is a flow diagram that illustrates a process for updating a set of nodes in a computing system in which processing is distributed across the set of nodes, according to an embodiment of the invention.

FIG. 4 is a flow diagram that illustrates a process for updating a set of nodes in a computing system in which processing is distributed across the set of nodes, according to an embodiment of the invention. In one embodiment, the process of FIG. 4 is performed by executing one or more sequences of instructions that cause one or more processors to perform the described actions, such as processors 504 of computer system 500 of FIG. 5.

As part of performing an update operation on a first subset of the set of nodes, the nodes in the first subset are disabled, at block 402, and the application is updated on the first subset of nodes, at block 404. For example, in the context of a data center that comprises a thousand nodes, nine hundred of the nodes are taken off-line while the instances of a database server executing on each of those nodes is updated. However, the other hundred nodes are left online and able to service requests.

As part of performing the update operation on a second subset of the set of nodes, the nodes in the second subset are disabled, at block 406, and the application is updated on the second subset of nodes, at block 408. Continuing with the datacenter example, after updating the server on the first subset of nodes, the hundred nodes are now taken off-line while the instances of the database server executing on each of these hundred nodes is updated. The entire system is now down, however, for a limited period of time while the hundred nodes are being updated.

At block 410, the first and second subsets of nodes are enabled so that all of the nodes can now service requests. Significantly, the second subset of nodes could consist of only one node. Hence, the entire system is disabled only when that one node is disabled for updating, thereby minimizing the overall downtime of the system.

Hardware Overview

Figure 5:
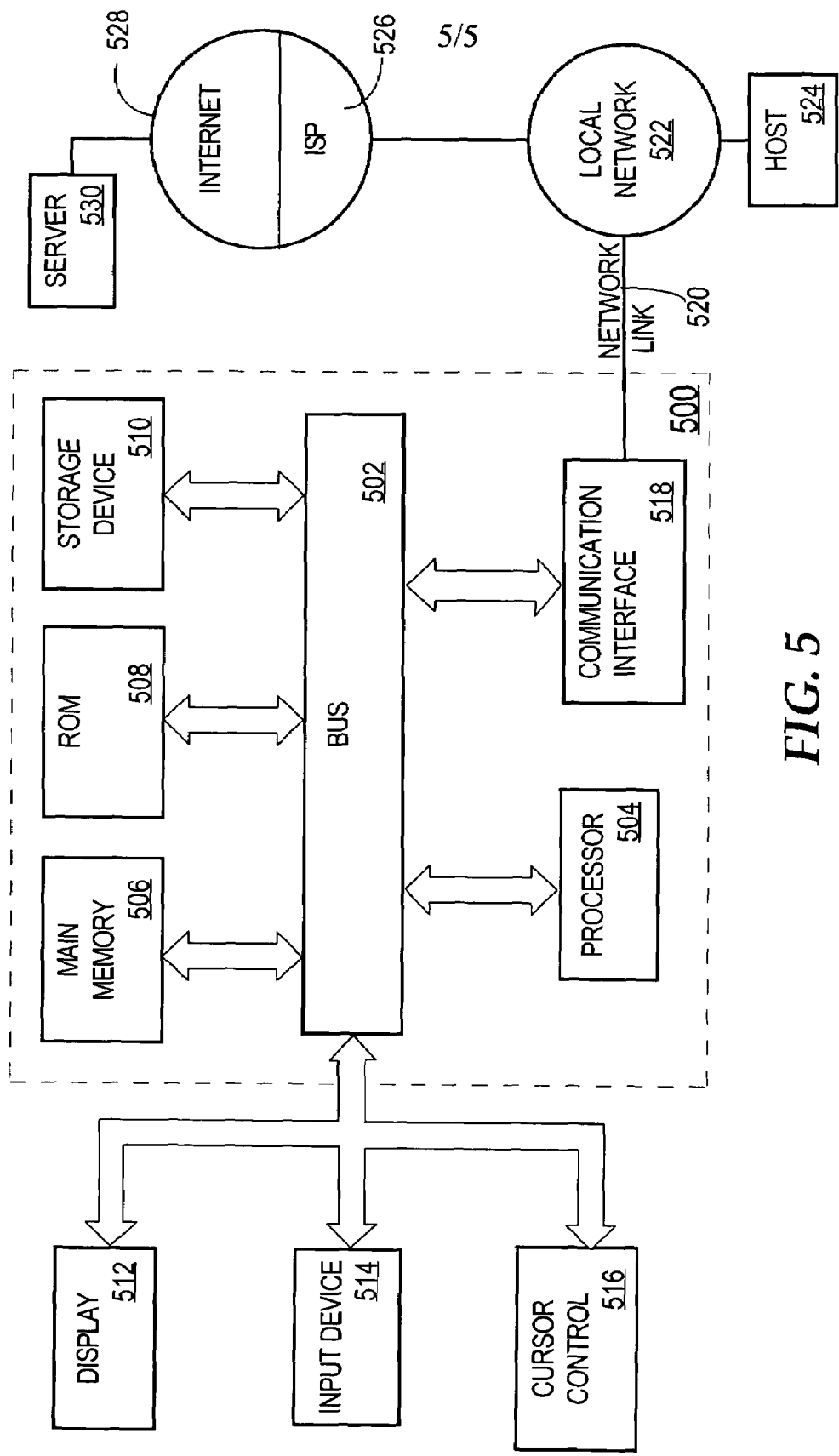
FIG. 5 is a block diagram that illustrates a computer system 500 upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for progressively provisioning a set of nodes in a computing system in which processing is distributed across the set of nodes, the method comprising:
configuring the computing system by:
identifying, to each of the nodes in the set, which nodes are in the set, and
specifying, to each of the nodes in the set, that the nodes in the set operate as peers in the computing system;
wherein configuring the computing system is performed by one or more processors;
wherein the steps of identifying and specifying include:
performing, on a first subset of the nodes, a provisioning operation associated with a software application,
wherein the provisioning operation is one of:
installing the software application,
upgrading the software application, or
patching the software application;
wherein the software application is designed such that instances of the software application interoperate with other instances of the software application on a peer-to-peer basis,
wherein the first subset is less than the entire set of nodes; and
without rolling back the provisioning operation on the first subset of nodes,
performing, on a second subset of the set of nodes, the provisioning operation associated with the software application, wherein the second subset is less than the entire set of nodes and is a different subset of nodes than the first subset of nodes;
wherein, while the provisioning operation associated with the software application is being performed on the first subset of nodes and before the provisioning operation associated with the software application is performed on the second subset of nodes, the second subset of nodes remains online while the first subset of nodes is taken offline for the provisioning operation; and
wherein, after the provisioning operation associated with the software application is performed on the second subset of nodes, instances of the software application that are running on nodes in both the first subset and the second subset are able to interoperate with each other on a peer-to-peer basis.

2. The method of claim 1, wherein performing the provisioning operation on a first subset of nodes includes:
copying application files to a first node of the first subset of nodes;
performing one or more actions on the application files on the first node;
indicating in an inventory associated with the system, that the application files are installed on the first node;
after updating the inventory,
copying the application files to a second node of the first subset of nodes, wherein the second node is a different node than the first node;
performing one or more actions on the application files on the second node; and
indicating in the inventory that the application files are installed on the second node.

3. The method of claim 2, further comprising:
adding a new node to the system;
copying the application files to the new node;
performing one or more actions on the application files on the new node; and indicating in the inventory that the application files are installed on the new node; and updating a node list to indicate to the first, second and new nodes that instances of the software application that are installed on the first, second, and new nodes are to interact with each other as peers in the computing system.

4. The method of claim 1, wherein performing the provisioning operation on the first subset of nodes includes:

copying one or more application files to a first node of the first subset of nodes;

separately from copying, performing one or more actions on at least one of the one or more application files on the first node;

updating an inventory that corresponds to the set of nodes to indicate that the one or more application files are installed on the first node;

in response to a failure associated with copying the one or more application files to a second node of the first subset of nodes or with performing one or more actions on the one or more application files on the second node, identifying at what point in performance of the provisioning operation the failure occurred; and restarting performance of the provisioning operation on the second node at the point at which the provisioning operation failure occurred, without recopying the application files that were copied before the failure.

5. The method of claim 4, further comprising:

reporting (a) that the one or more application files are installed on the first node, and (b) that a failure occurred in copying, or in performing one or more actions on, the one or more application files on the second node.

6. The method of claim 1, wherein performing the provisioning operation on the first subset of nodes includes:

disabling the first subset of nodes;

updating the application on the first subset of nodes while instances of the software application that are running on the second subset of nodes continue to provide services;

wherein performing the provisioning operation on the second subset of nodes includes, after updating the application on the first subset of nodes:

disabling the second subset of nodes;

updating the application on the second subset of nodes; and enabling the first and second subsets of nodes.

7. The method of claim 6, wherein the second subset of nodes consists of only one node.

8. The method of claim 1, wherein said performing the provisioning operation on the first subset of nodes, and said performing the provisioning operation on the second subset of nodes are performed from a single node in response to user input received by a system management tool running on said single node.

9. The method of claim 1, wherein the provisioning operation involves multiple phases, and the method includes scheduling execution of a particular phase of the multiple phases separately and independently of executing other phases of the multiple phases.

10. The method of claim 1, wherein the software application is a database server, and the instances of the software application are database servers that have shared access to data in a same database.

11. A machine-readable storage device storing one or more sequences of instructions which, when executed by one or more processors, causes the one or more processors to perform:

configuring a computing system in which processing is distributed across a set of nodes, wherein the configuring comprises:

identifying, to each of the nodes in the set, which nodes are in the set, and specifying, to each of the nodes in the set, that the nodes in the set operate as peers in the computing system;

wherein the identifying and specifying include:

performing, on a first subset of the nodes, a provisioning operation associated with a software application, wherein the provisioning operation is one of:

installing the software application, upgrading the software application, or patching the software application;

wherein the software application is designed such that instances of the software application interoperate with other instances of the software application on a peer-to-peer basis, wherein the first subset is less than the entire set of nodes; and without rolling back the provisioning operation on the first subset of nodes, performing, on a second subset of the set of nodes, the provisioning operation associated with the software application, wherein the second subset is less than the entire set of nodes and is a different subset of nodes than the first subset of nodes:

wherein, while the provisioning operation associated with the software application is being performed on the first subset of nodes and before the provisioning operation associated with the software application is performed on the second subset of nodes, the second subset of nodes remains online while the first subset of nodes is taken offline for the provisioning operation; and wherein, after the provisioning operation associated with the software application is performed on the first subset of nodes and before the provisioning operation associated with the software application is performed on the second subset of nodes, instances of the software application that are running on nodes in the first subset of nodes but not the second subset of nodes are able to interoperate with each other on a peer-to-peer basis; and wherein, after the provisioning operation associated with the software application is performed on the second subset of nodes, instances of the software application that are running on nodes in both the first subset and the second subset are able to interoperate with each other on a peer-to-peer basis.

12. A machine-readable storage device as recited in claim 11, wherein performing the provisioning operation on a first subset of nodes includes:

copying application files to a first node of the first subset of nodes;

performing one or more actions on the application files on the first node;

indicating in an inventory associated with the system, that the application files are installed on the first node;

after updating the inventory, copying the application files to a second node of the first subset of nodes, wherein the second node is a different node than the first node;

performing one or more actions on the application files on the second node; and indicating in the inventory that the application files are installed on the second node.

13. A machine-readable storage device as recited in claim 12, wherein the one or more sequences of instructions further causes the one or more processors to perform:
adding a new node to the system;
copying the application files to the new node;
performing one or more actions on the application files on the new node; and
indicating in the inventory that the application files are installed on the new node; and
updating a node list to indicate to the first, second and new nodes that instances of the software application that are installed on the first, second, and new nodes are to interact with each other as peers in the computing system.

14. A machine-readable storage device as recited in claim 11, wherein performing the provisioning operation on the first subset of nodes includes:
copying one or more application files to a first node of the first subset of nodes;
separately from copying, performing one or more actions on at least one of the one or more application files on the first node;
updating an inventory that corresponds to the set of nodes to indicate that the one or more application files are installed on the first node;
in response to a failure associated with copying the one or more application files to a second node of the first subset of nodes or with performing one or more actions on the one or more application files on the second node,
identifying at what point in performance of the provisioning operation the failure occurred; and
restarting performance of the provisioning operation on the second node at the point at which the provisioning operation failure occurred, without recopying the application files that were copied before the failure.

15. A machine-readable storage device as recited in claim 14, wherein the one or more sequences of instructions further causes the one or more processors to perform:
reporting (a) that the one or more application files are installed on the first node, and (b) that a failure occurred in copying, or in performing one or more actions on, the one or more application files on the second node.

16. A machine-readable storage device as recited in claim 11, wherein performing the provisioning operation on the first subset of nodes includes:
disabling the first subset of nodes;
updating the application on the first subset of nodes while instances of the software application that are running on the second subset of nodes continue to provide services;
wherein performing the provisioning operation on the second subset of nodes includes,
after updating the application on the first subset of nodes;
disabling the second subset of nodes;
updating the application on the second subset of nodes; and
wherein the one or more sequences of instructions further causes the one or more processors to perform enabling the first and second subsets of nodes.

17. A machine-readable storage device as recited in claim 16, wherein the second subset of nodes consists of only one node.

18. A machine-readable storage device as recited in claim 11, wherein said performing the provisioning operation on the first subset of nodes, and said performing the provisioning operation on the second subset of nodes are performed from a single node in response to user input received by a system management tool running on said single node.

19. A machine-readable storage device as recited in claim 11, wherein the provisioning operation involves multiple phases, and wherein the one or more sequences of instructions further causes the one or more processors to perform scheduling execution of a particular phase of the multiple phases separately and independently of executing other phases of the multiple phases.

20. A machine-readable storage device as recited in claim 11, wherein the software application is a database server, and the instances of the software application are database servers that have shared access to data in a same database.

* * * * *